United States Patent [19]
Romstad

[11] 3,874,096
[45] Apr. 1, 1975

[54] EDUCATIONAL FLASH CARD ASSEMBLIES

[76] Inventor: Catherine J. Romstad, 500 Henes Pk. Dr., Menominee, Mich. 49858

[22] Filed: Nov. 1, 1973

[21] Appl. No.: 411,639

[52] U.S. Cl. .................................. 35/31 E, 35/75
[51] Int. Cl. .................................. G09b 1/36
[58] Field of Search...... 35/31 R, 31 D, 31 E, 31 G, 35/9 E, 75; 46/34, 36, 157

[56] References Cited
UNITED STATES PATENTS

| | | | |
|---|---|---|---|
| 565,797 | 8/1896 | Roller | 35/75 |
| 850,150 | 4/1907 | Glazier | 46/36 |
| 1,538,529 | 5/1925 | Troidl | 35/75 |
| 1,641,982 | 9/1927 | McDade | 35/75 |
| 1,728,491 | 9/1929 | Janneson | 35/75 |
| 2,145,794 | 1/1939 | Huber | 46/34 |
| 2,317,206 | 4/1943 | Major | 35/31 D |
| 2,881,662 | 4/1959 | Harris | 116/63 P X |
| 2,982,032 | 5/1961 | Cooke | 35/75 |
| 3,206,872 | 9/1965 | Nason et al. | 35/31 G |
| 3,374,559 | 3/1968 | Smith | 35/31 G |
| 3,435,541 | 4/1969 | Tacey | 35/75 X |
| 3,491,193 | 1/1970 | Bianchi | 35/75 X |
| 3,690,019 | 9/1972 | Fernandez | 35/31 R |
| 3,789,517 | 2/1974 | Romstad | 35/9 E |

*Primary Examiner*—Wm. H. Grieb
*Attorney, Agent, or Firm*—Robert G. McMorrow

[57] ABSTRACT

Flash card training devices in which a plurality of exhibitors are interengaged to relate indicia thereon in such manner as to form mathematic or other equations have cards with back panels and front panels connected to form a sleeve-like slideway. The front panels and portions of the back panels bear indicia which are adapted for alignment when the cards are engaged. Changeable orientation of the cards provides different exhibition of equations.

Modified forms provide for self-support of the card assemblies on a planar surface.

12 Claims, 20 Drawing Figures

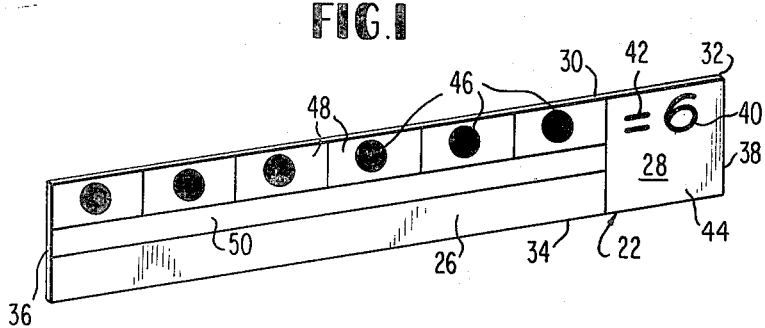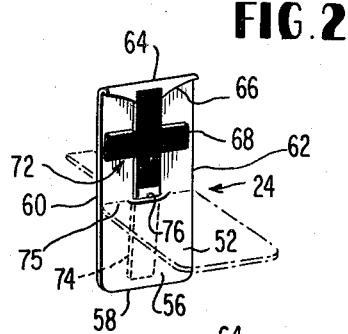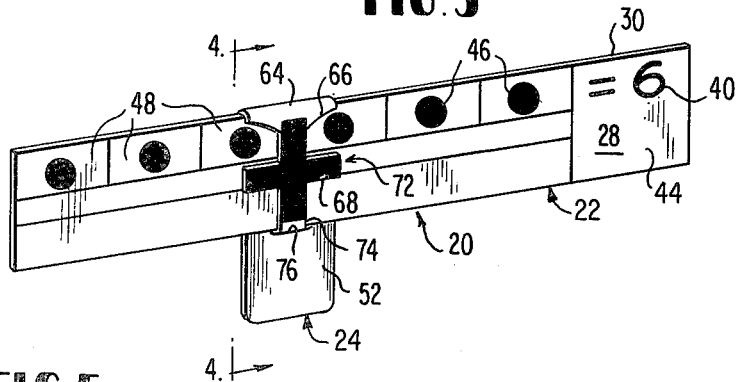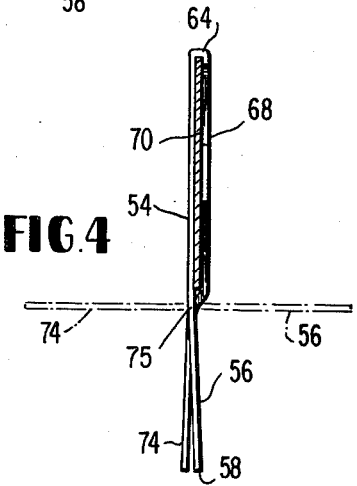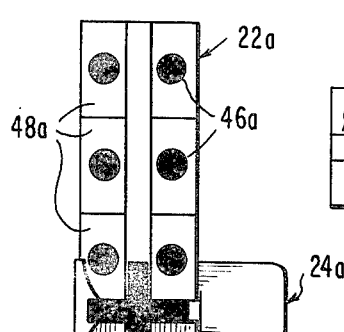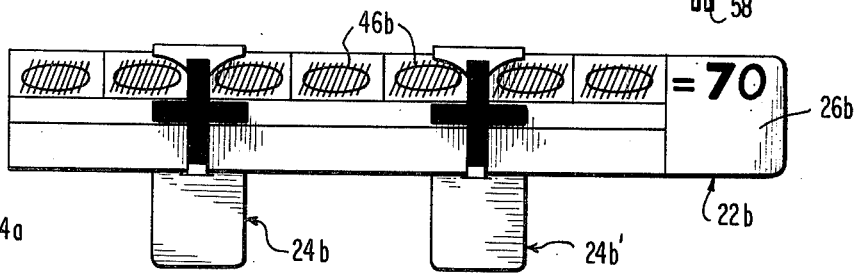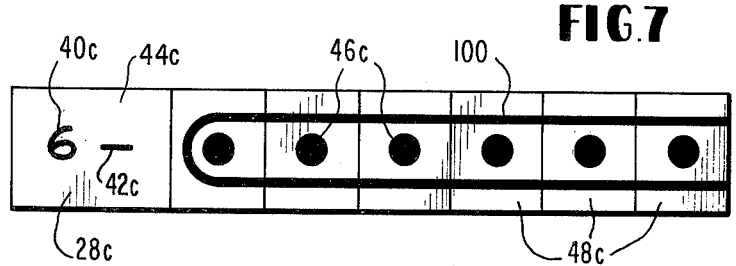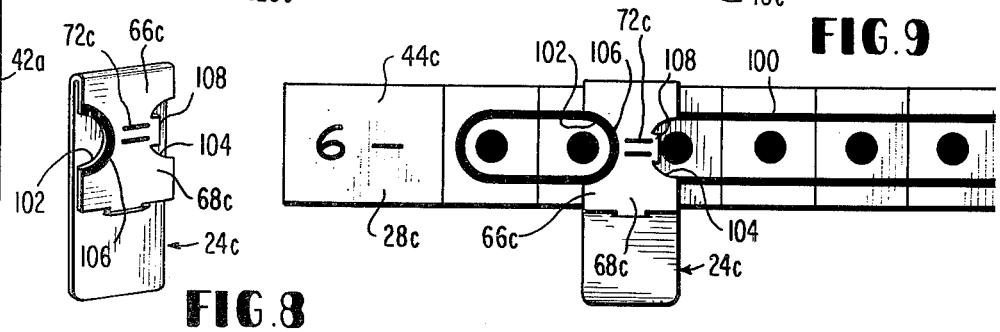

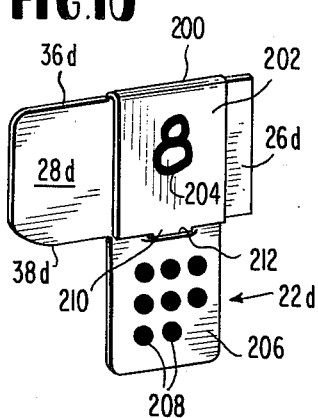
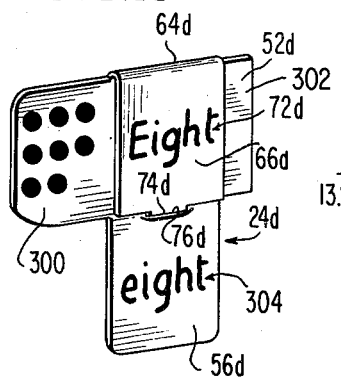
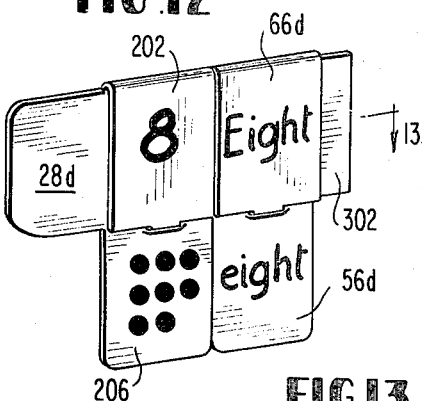
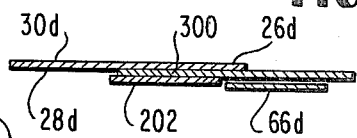
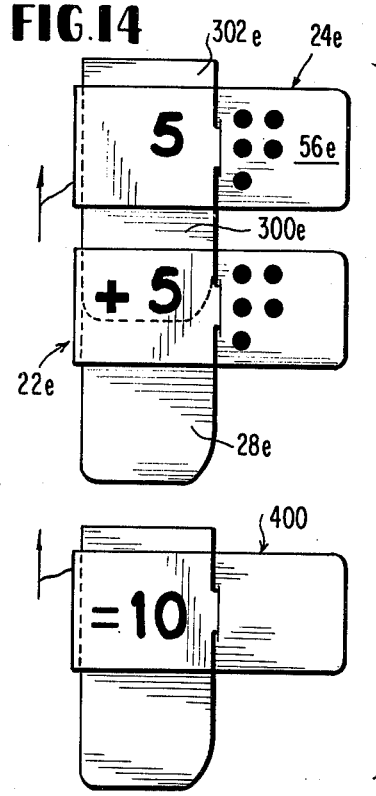
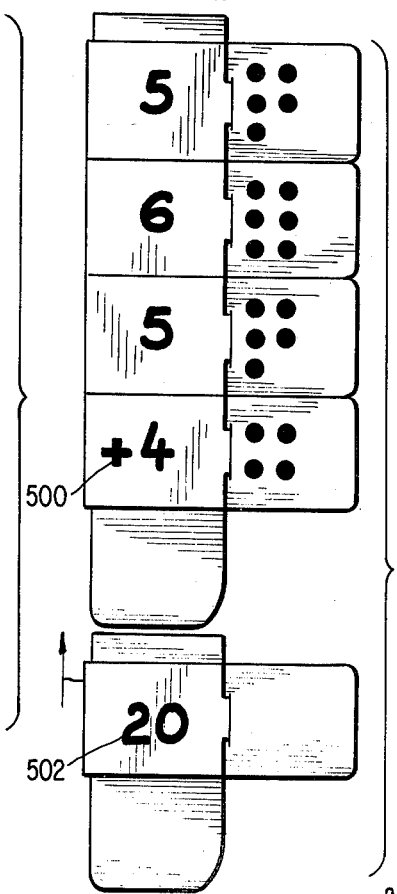
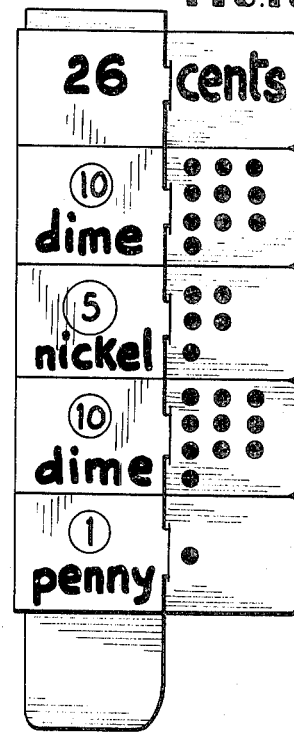
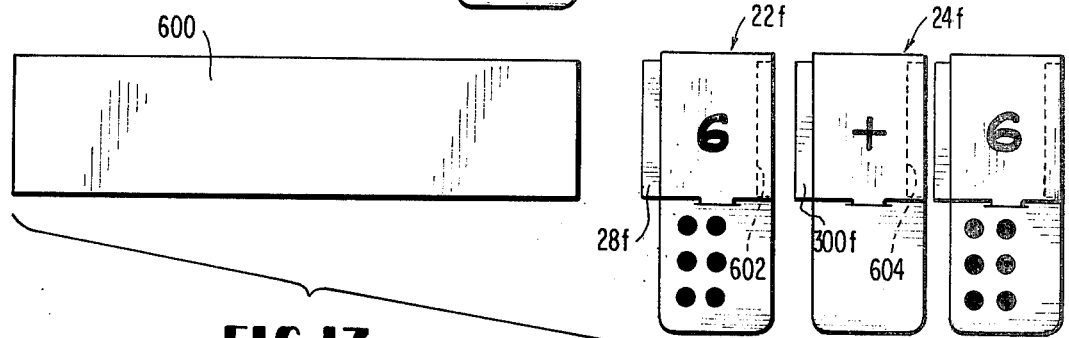

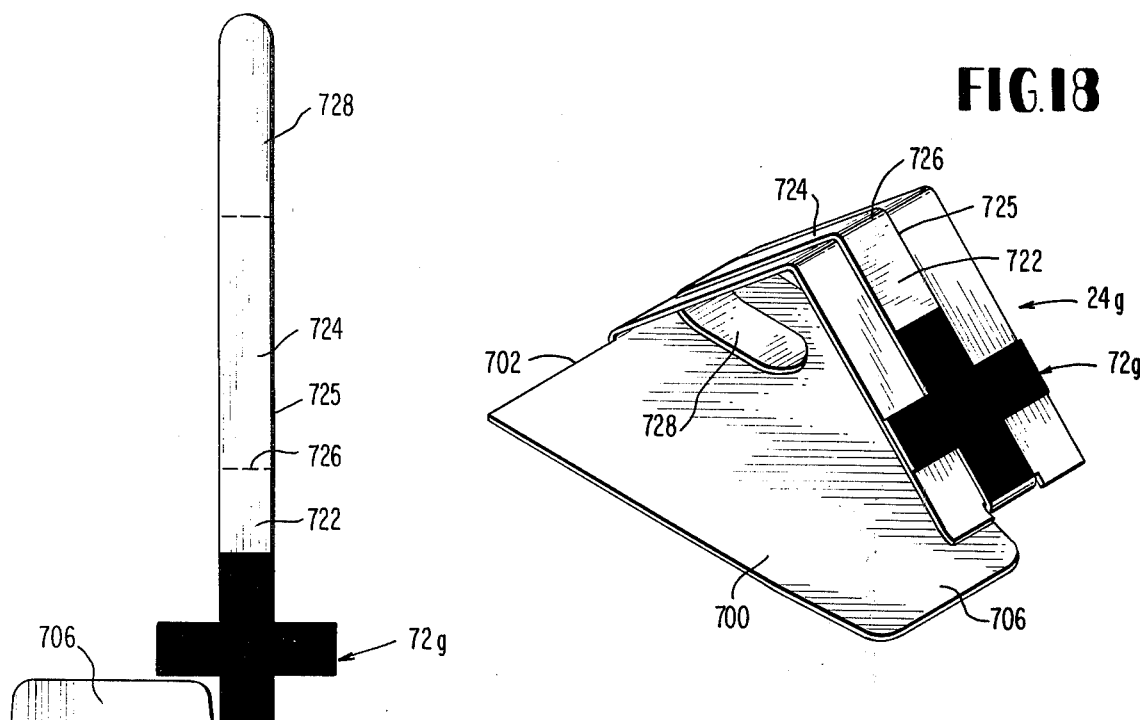
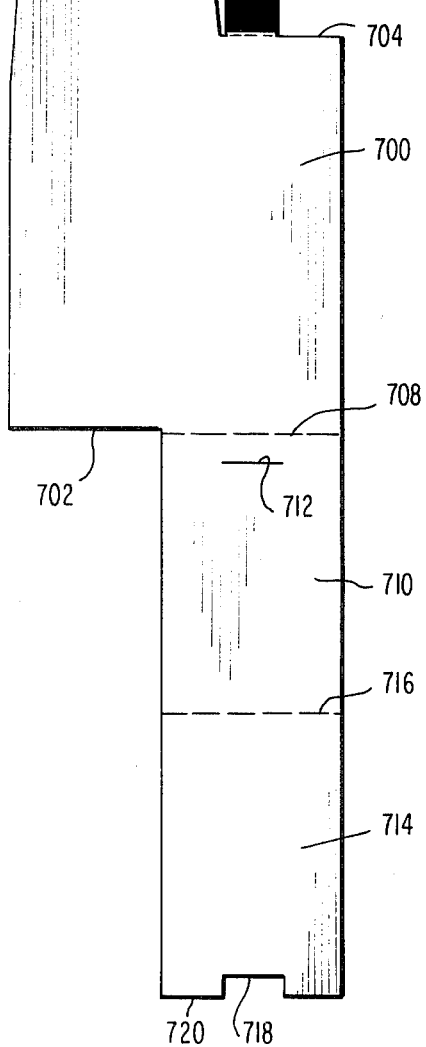
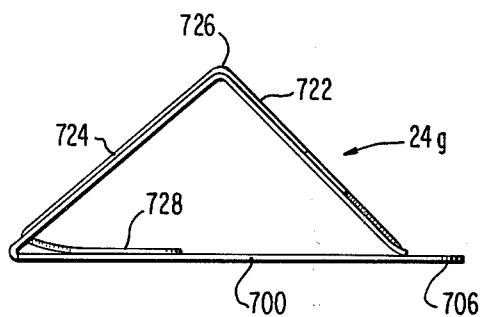

EDUCATIONAL FLASH CARD ASSEMBLIES

CROSS-REFERENCE TO RELATED APPLICATION

This invention pertains to subject matter related to that in my prior copending application Ser. No. 309,723, filed Nov. 27, 1972 now U.S. Pat. No. 3,789,517, issued Feb. 5, 1974.

BACKGROUND OF THE INVENTION

1. Field of the Invention

This invention pertains to educational devices adapted for manipulation and visual relation of series of numbers thereto. Such devices combine the attributes of traditional flash card training with manipulatable apparatus to enhance retention.

2. Statement of the Prior Art

Changeable exhibitors employed in the teaching of mathematics, in addition to to the subject matter of my prior application, have been previously known in the educational field. Prior U.S. patents in this area include the following:

| Patent No. | Patentee | Issue Date |
|---|---|---|
| 565,797 | Roller | Aug. 11, 1896 |
| 1,538,529 | Troidl | May 19, 1925 |
| 1,641,982 | McDade | Sept. 13, 1927 |
| 1,728,491 | Janneson | Sept. 17, 1929 |
| 2,317,206 | Major | April 20, 1943 |
| 2,982,032 | Cooke | May 2, 1961 |
| 3,206,872 | Nason et al | Sept. 21, 1965 |
| 3,374,559 | Smith | March 26, 1968 |
| 3,435,541 | Tacey | April 1, 1969 |
| 3,491,193 | Bianchi | Jan. 20, 1970 |
| 3,690,019 | Fernandez | Sept. 12, 1972. |

SUMMARY OF THE INVENTION

The present invention pertains to novel educational apparatus employed in learning situations wherein relation of a visible concept to a manual exercise increases retention of the concept. These devices are particularly useful in mathematical drill, and also in language skill development, color perception and similar visual/intellectual training. The devices hereof are particularly useful in imparting skills to young children. At preschool levels, childhood experiences are essentially activity oriented. The beginning learner is therefore required to transfer his activity to intellectual undertakings as he enters primary training levels. The present device is useful in the transition to the cognitive domain of learning. The devices further promote psychomotor activity, and visual/manual coordination.

A principal objective of the invention resides in the provision of a learning tool which inhibits the boredom often associated with rote drill techniques. The exhibitors hereof are changeable in nature, thereby retaining interest through the necessity to manipulate the components.

In certain forms of the invention, the components are so arranged as to be readily manipulated from either side, thereby appealing to both right handed and left handed children.

Employment of these devices permits children to progress at individual rates. The units offer drill which is both entertaining and readily understandable.

The units are employed in numerous activities. One method of use involves the student manipulating the device and writing equations on a work sheet. This provides a further step in the learning process (e.g., translation from observation to writing), and also avoids the undesirable situation wherein equations are printed or written out in advance by the instructor. Again, with these units, assignments may be tailored to the needs and abilities of individual children.

An important feature of the invention pertains to the increasing complexity of the various forms. In the basic units hereof, simple sliding movement of a portion of the exhibitor provides a relationship between the indicia. As the learner progresses, more complex forms requiring assembly of components, are available.

The invention further provides for the use of the arrangements in differential attitudes, such as vertically and horizontally. Additional numbers of the units may be employed to provide advanced problems.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a perspective view of an elongated slide strip comprising a component of a first form of the invention;

FIG. 2 is a perspective view of a slidable member comprising a second component of the aforesaid first form of the invention;

FIG. 3 is a perspective view showing the components in assembled condition;

FIG. 4 is an enlarged sectional view on line 4—4 of FIG. 3, looking in the direction of the arrows;

FIG. 5 is a plan view showing a modification of components of FIGS. 1 through 4;

FIG. 6 shows in plan view a further embodiment of the invention;

FIG. 7 is a plan view of a slide strip of a fourth form of the unit;

FIG. 8 is a perspective view of a slide member as used with the strip of FIG. 7;

FIG. 9 is a plan view showing the components of FIGS. 7 and 8 in assembled condition;

FIGS 10 and 11 are perspective views of further modifications of the invention;

FIG. 12 shows the components of FIGS. 10 and 11 in assembled condition;

FIG. 13 is a sectional view showing details taken on line 13—13 of FIG. 12, looking in the direction of the arrows;

FIG. 14 is a partially disassembled plan view showing use of units similar to those in FIGS. 10 through 13;

FIG. 15 is another plan view, partially disassembled, showing the use of units similar to those of FIGS. 10 through 14;

FIG. 16 is an assembled plan view showing still further similar units with a modified form of indicia thereon;

FIG. 17 is a dissassembled plan view showing a further modification;

FIG. 18 shows a further form of the invention in perspective, assembled view;

FIG. 19 shows the device of FIG. 18 in flattened, plan view; and

FIG. 20 is a side elevational view.

DESCRIPTION OF THE PREFERRED EMBODIMENTS

Referring to the drawings in more detail, and initially to FIGS. 1 through 4, a first form of the invention is therein shown. The device comprises a flash card assembly 20 including a pair of exhibitors 22 and 24 shown assembled in FIG. 3, and individually in FIGS. 1 and 2. The first exhibitor 22 comprises an elongated, substantially rectangular slide strip formed of a panel 26 of cardboard, plastic, or similar material. The panel has opposite front and rear surfaces 28 and 30, respectively, and top and bottom side edges 32, 34. Between the ends 36, 38, the panel is provided on its front surface 28 with various indicia. Such indicia illustratively includes a conclusionary numeral 40 accompanied by an equal symbol 42 located in a box area 44 adjacent the end 38; a series of dots 46 located in boxes 48 provided adjacent the top side edge 32; and a central elongated slide box 50.

The slide member 24 constitutes the second exhibitor component. Again, the unit is formed of heavy paper stock, plastic, or the like, and has a back panel 52 with opposite inner and outer surfaces 54, 56. The back panel further includes a base edge 58 and sides 60, 62. At a top fold portion 64, the back panel is secured to a front panel 66. The front panel 66 also has opposite inner and outer surfaces 68, 70, provided with indicia 72. In this particular form of the the invention, the main extent of the front panel 66 is in the form of a plus sign. As will be understood, other mathematical symbols may be substituted therefor, such as minus, greater than, or less than notations. Depending from the front panel 66 is an elongated tab 74. The back panel 52 has a slit 76 formed therein at a depth slightly greater than the height of the slide strip panel 26. The tab 74 is extended through the slit, and as shown in FIG. 4, is of a length such that is substantially co-terminus in depth with the base edge 58. This extension of the tab through the slit forms a sleeve-like portion on the slide member.

As shown in FIGS. 2 and 4, the slide member 24 is adapted for folding in such manner as to support the assembled components in upright condition. To this objective, the back panel 52 has a fold line 75 and the tab 74 has a coaligned fold line (not shown). Thus, the tab and lower portion of the back panel may optionally be folded in opposite horizontal directions as shwon, to provide a base support for the device.

It will be noted that the slide member is engaged on the slide strip in such manner that the indicia bearing front surface of the strip is exposed as well as the outer surface 70 of the strip front panel 66. The plus symbol 72 is so positioned that the horizontal cross portion thereof is aligned with the slide box 50. In the illustrated example, six separate dots 46 are located in the six boxes 48, and the equal symbol 42 is interposed between the dots and the conclusionary numeral 40, constituting here the number 6. Thus, positioning of the slide member 24 in the location shown in FIG. 3 provides training that 3 plus 3 equals 6. The movement of the slide member to other positions demonstrates the other combinations of integers which also equal 6.

In FIG. 5, a unit of similar construction is shown, and components of like structure to those previously described bear the same reference character with the letter a added to differentiate. In this form of the invention, two rows of dot indicia 46a are provided in boxes 48a, arranged on opposite sides of a central slide box 50a of the first exhibitor 22a. A bar indicia 42a is employed at the end of the column of dots, and a conclusionary numeral 40a is disposed thereunder. This format permits the teaching of addition of more abstract sums of dot indicia.

FIG. 6 discloses yet another embodiment (the letter b being added to reference numerals to distinguish from above described subject matter). Here, the indicia 46b consists of linear displays of "tens," and two separate second exhibitors 24b and 24b' are engaged on the slide panel 26b. This permits instruction and practice in cumulative figures, e.g., the addition of 20 plus 30 plus 20, equalling 70.

An adaptation of this concept for the teaching of subtraction is shown in FIGS. 7 through 9. Here, the first exhibitor 22c has the base numeral 40c followed by the minus sign 42c in a first section 44c on the front surface 28c. This is followed by a series of box enclosures 48c each having a dot indicia 46c therein. A band-like marking 100 extends about the dots as shown. The second exhibitor 24c has a front panel 66c of generally rectangular outline, having substantially semi-circular indentations 102, 104 at its sides. Immediately adjacent the edge of the indentation 102 is a marking 106 which aligns at its ends with the band-like marking 100 of the first exhibitor when the components are assembled, enabling the display of an enclosed group of dots, as shown in FIG. 9. A stub tab 108 extends from the panel 66c centrally of the indentation 108, and equal symbol indicia 72c is disposed on the outer surface 68c between the indentations. Thus, by movement of the second exhibitor, it is demonstrable for example, that 6 minus 2 equals 4.

FIGS. 10 through 13 relate to another embodiment of the concept. Here the exhibitors are employed in various combinations, and the unit of FIG. 10 is referred to arbitrarily as a first exhibitor 22d. This comprises an elongated slide strip defined by a panel 26d. The panel has opposite front and rear surfaces 28d, 30d and top and bottom edges 36d, 38d. A fold portion 200 extends to a forward flap 202 with, for example, a numeral indicia 204 thereon. A lower panel 206 depends integrally from the edge 38d of the panel 26d, and has dot indicia 208 corresponding or otherwise related to the numeral on the flap 204. A tab element 210 on the flap extends through a slit 212 in the lower panel.

In FIG. 11, the second exhibitor 24d is shown. This unit, in structure, is identical to the exhibitor 22d described immediately above, but is descriptively distinguished herein by its functional role in the combination. The exhibitor 24d comprises a slide member for engagement with the exhibitor 22d in forming numeral or other comparisons, equations, or the like. The exhibitor 24d has a back panel 52d, a front panel 66d connected to the back panel at a fold section 64d, and a tab element 74d which extends through a slit 76d in the back panel. Indicia, here in the form of a word representation of a number 72d appears on the exposed face of the front panel. The back panel has side extensions 300, 302 projecting laterally, the extension 300 being of a length greater than that of the extension 302. Further word indicia 304 is provided on the exposed portion of the outer surface 56d of the back panel. As shown in FIGS. 12 and 13, the extension 300 is slidably engaged between the panel 26d and the forward flap 202 of the first exhibitor.

Further adaptations of this are shown in FIGS. 14 through 16. In FIG. 14 two exhibitors 22e and 24e are assembled, and the indicia thereon showns an addition problem, calling for the connection of an answer exhibitor. The correct answer exhibitor, selected by the learner from a group of correct and incorrect exhibitors is indicated at 400. Similarly, in FIG. 15 it is shown that individual exhibitors may have only indicia such as a plus symbol 500, or a total symbol 502, and that infinite combinations of these are possible. FIG. 16 shows a variance in the type of indicia employed.

In FIG. 17, a blank slide card 600 is used for connection and convenient holding of a series of first and second exhibitors 22f and 24f. These exhibitors are similar to those shown in FIGS. 10 and 11, respectively, except that the lateral extensions 28f and 300f of the former are of appreciably less extent, and the opposite sides have indentations 602, 604 shaped to receive the respective extensions. Thus, the exhibitors are sequentially arranged on the slide card in any desired order.

FIGS. 18 through 20 disclose another form of the second exhibitor 24g. This is usual with the first component 22 as shown in FIGS. 1 through 4, and provides a stable and convenient support means for the assembly. The unit is initially flat as shown in FIG. 19, but in use, occupies the assembled condition of FIGS. 18 and 20. The assembly includes an enlarged base portion 700 having opposite ends 702, 704. The end 704 has an extended tab 706 for ease of manipulation of the exhibitor when assembled. Hingedly connected to the end edge 702 at a fold line 708 is an angle panel 710. As best seen in FIG. 19, the panel 710 has a transverse slit 712 therein adjacent the fold line 708.

A support panel 714 is hingedly connected to the angle panel at a second fold line 716. A slot 718 is provided at the edge 720 remote from the fold line.

A front panel 722 is hingedly connected to the base portion at the end 704 thereof. The front panel is provided with indicia 72g in the form of a plus sign. A connecting strip 724 has a first section 725 which is hinged to the front panel at a fold 726, and a terminal second section 728. The second section 728 is reverted through the slit 712, and it will be observed that the front panel seats in the slit 718 of the support panel. Thus, the front panel, when folded back against the support panel, defines a slideway therebetween for the first exhibitor.

I claim:
1. An educational flash card device comprising:
a plurality of interengaged exhibitor members each having a back panel with opposite front and rear surfaces;
the front surface of the panel comprising a slide surface, at least a portion of which is exposed when the members are disengaged;
at least one of the exhibitor members having a fold portion;
the back panel of said one exhibitor having a slit formed therein at a location remote from the fold portion;
the front panel of said one exhibitor, having inner and outer surfaces, the outer surface having indicia thereon;
a tab extending from the front panel of said one exhibitor and extended through said slit of said back panel whereby said one exhibitor member forms a sleeve portion; and
the sleeve portion of said one exhibitor being engaged about the back panel of another exhibitor.
2. The invention of claim 1, wherein:
each of the interengaged exhibitor members is of the same construction.
3. The invention of claim 2, wherein:
the exhibitor members have different indicia thereon.
4. The invention of claim 1, and:
an elongated slide strip extended through the sleeve portion of said one exhibitor.
5. The invention of claim 1, wherein:
another of said interengaged exhibitor members comprises an elongated slide strip having indicia on its front surface.
6. The invention of claim 5, wherein:
the indicia on said one exhibitor is adapted for correlation to the indicia on the slide strip to exhibit mathematical equations.
7. The invention of claim 6, wherein:
the front panel of said one exhibitor is in the form of a plus sign.
8. The invention of claim 6, wherein:
the front panel of said one exhibitor has indentations on opposite sides thereof with said indicia arranged between the indentations.
9. The invention of claim 1, wherein:
the exposed portion of the front surface of said one exhibitor has indicia thereon corresponding to the indicia on the outer surface of the front panel.
10. An educational flash card device comprising:
a first exhibitor comprising an elongated slide strip having an exposed surface, and the slide strip having opposite side edges;
second exhibitor means comprising at least one slide member slidably engaged on the slide strip;
the slide member having a back panel with opposite front and rear surfaces;
the back panel of the slide member having a slit formed therein;
the slide member having a fold portion slidably engaging one of the side edges of the slide strip;
the slide member having a front panel with indicia thereon; and
the slide member having a tab section extended through the slit of the back panel to conform the slide member about the slide strip.
11. In an educational flash card device, the combination comprising:
a first exhibitor comprising an elongated slide strip;
a second exhibitor comprising a base portion having opposite ends;
an angle panel hingedly connected to the base portion at a fold line on one of said ends, the angle panel having a slit formed therein;
a support panel hingedly connected to the angle panel at a second fold line, the support panel having a slot therein on an edge remote from the second fold line;
a front panel hingedly connected to the base portion at the other of said ends thereof, the front panel having indicia thereon, the front panel overlying the support panel and forming a slideway therebetween;
a connecting strip having a first section and a second section extending from the front panel, the first section overlying the angle panel and the second section extending through the said slit; and
the first exhibitor being slidably engaged in said slideway.

12. The invention of claim 11, and:
the base portion having an extension on said other end forming a handle means.

* * * * *